United States Patent
Jeon et al.

(10) Patent No.: US 11,720,217 B2
(45) Date of Patent: Aug. 8, 2023

(54) TOUCH SENSING CIRCUIT FOR ENHANCING PERFORMANCE OF GLOVE TOUCH AND METHOD FOR OPERATING SAME

(71) Applicant: LX Semicon Co., Ltd., Daejeon (KR)

(72) Inventors: Jun Tak Jeon, Daejeon (KR); Kyung Hwan Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/518,131

(22) Filed: Nov. 3, 2021

(65) Prior Publication Data

US 2022/0179520 A1    Jun. 9, 2022

(30) Foreign Application Priority Data

Dec. 8, 2020  (KR) .......... 10-2020-0170270

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0416* (2013.01)

(58) Field of Classification Search
CPC .... G06F 3/0446; G06F 3/0412; G06F 3/0416; G06F 13/4282
See application file for complete search history.

(56) References Cited

U.S. PATENT DOCUMENTS

| | | | |
|---|---|---|---|
| 10,055,056 B2 | 8/2018 | Jang et al. | |
| 10,198,064 B2 | 2/2019 | Kwon et al. | |
| 10,409,482 B2 | 9/2019 | Cheng | |
| 2014/0267085 A1* | 9/2014 | Li | G06F 3/041 345/173 |
| 2014/0267108 A1* | 9/2014 | Chung | G06F 3/041661 345/173 |
| 2016/0320898 A1* | 11/2016 | Tang | G09G 3/3655 |
| 2017/0090624 A1* | 3/2017 | Kwon | G06F 1/3262 |
| 2017/0192608 A1 | 7/2017 | Jang et al. | |
| 2020/0192544 A1 | 6/2020 | Chung et al. | |
| 2021/0208725 A1* | 7/2021 | Derichs | G06F 3/0445 |

FOREIGN PATENT DOCUMENTS

| | | | |
|---|---|---|---|
| KR | 10-2014-0114727 A | 9/2014 | |
| KR | 10-2016-0134273 A | 11/2016 | |
| KR | 10-2017-0080913 A | 7/2017 | |
| KR | 10-2020-0073003 A | 6/2020 | |

* cited by examiner

*Primary Examiner* — Liliana Cerullo
(74) *Attorney, Agent, or Firm* — Rothwell, Figg, Ernst & Manbeck, P.C.

(57) ABSTRACT

The present embodiment relates to a touch sensing circuit configured to control a driving signal transferred to a power circuit and, more specifically, to a touch sensing circuit and a method for operating a touch sensing circuit, the touch sensing circuit including: a readout circuit configured to output a driving signal for driving a touch electrode included in a panel; a power circuit configured to supply driving power to the readout circuit; and a touch control circuit communicating with the power circuit to control the amplitude of a driving signal.

17 Claims, 10 Drawing Sheets

In case of having no additional interface between MCU and TPIC

Signal transferred to TPIC (regardless of type of touch input)    Signal transferred to TPIC (regardless of type of touch input)

In case of having additional interface between MCU and TPIC

Signal transferred to TPIC (before determining type of touch input)    Signal transferred to TPIC (after determining type of touch input)

TOUCH SENSING CIRCUIT FOR ENHANCING PERFORMANCE OF GLOVE TOUCH AND METHOD FOR OPERATING SAME

CROSS-REFERENCE TO RELATED APPLICATIONS

This application claims priority under 35 U.S.C. § 119(a) from Republic of Korea patent application no. 10-2020-0170270 filed on Dec. 8, 2020, which is incorporated by reference herein in its entirety.

BACKGROUND

1. Field of Technology

The present embodiment relates to a touch sensing technology for enhancing performance of a glove touch.

2. Description of the Prior Art

A technology of recognizing an external object that is in proximity to a touch panel or touches the touch panel is called a touch sensing technology. The touch panel is placed on a plane such as a display panel, and accordingly, users can input a user manipulation signal to the touch panel while watching an image of the display panel. A method for generating the user manipulation signal provides exceptional user intuitiveness as compared to the conventional user manipulation signal input scheme, for example, a mouse input scheme or a keyboard input scheme.

According to the mentioned advantage, the touch sensing technology is applied to various electronic devices including a display panel. A touch sensing circuit may supply a driving signal to a driving electrode disposed on a touch panel, receive a response signal generated at a sensing electrode, and sense the proximity or the touch of an external object to or on the touch panel. The touch panel generates capacitance between the driving electrode and the sensing electrode, and a change in the capacitance may indicate the proximity or the touch of the external object.

An interruption to the proximity or the touch of the external object from another external object may cause reduction of sensitivity, and thus the touch sensing circuit amplifies a driving signal when transferring the same to the driving electrode disposed on the touch panel.

The conventional touch sensing circuit does not determine whether there is another external object, and even in a case in which low sensitivity is required since there is no interruption to the touch from another external object, a high driving voltage is constantly transferred, whereby consumption power of the touch panel cannot be efficiently used.

In addition, the conventional touch sensing circuit does not determine the presence of another external object, for example, a glove worn by a user, and does not include an interface for performing bidirectional communication between a touch control circuit and a touch power circuit, and thus a driving voltage cannot be effectively controlled for each frame.

SUMMARY OF THE INVENTION

In this background, the present disclosure is to provide a technology of providing an interface for bidirectional communication between a touch control circuit and a touch power circuit of a touch sensing circuit, thereby enhancing touch sensitivity of a glove and reducing power consumption.

In view of the foregoing, a first embodiment may provide a touch sensing circuit including: a readout circuit configured to transmit a driving signal to a touch electrode disposed on a panel; a touch power circuit configured to supply the driving signal to the readout circuit; and a touch control circuit which has a control interface between the touch control circuit and the touch power circuit and is configured to control an amplitude of the driving signal through the control interface.

In view of the foregoing, a second embodiment may provide a touch sensing circuit including: a readout circuit configured to transmit a driving signal to a touch electrode disposed on a panel; a touch power circuit configured to supply power to the readout circuit; and a touch control circuit which has a control interface between the touch control circuit and the readout circuit and is configured to control an amplitude of the driving signal through the control interface.

In view of the foregoing, a third embodiment may provide a touch control circuit including: a first interface which is connected to a touch power circuit supplying power and a touch control circuit, and is configured to transfer a touch power circuit driving signal; a second interface which is distinguished from the first interface, is connected to the touch power circuit and the touch control circuit, and is configured to transfer a touch power circuit control signal; and a third interface which is connected to the touch control circuit and a readout circuit operating a touch electrode included in a panel and is configured to transfer a readout circuit driving signal, wherein the first interface transfers a waveform of the touch power circuit driving signal, and the second interface transfers the touch power circuit control signal which changes an amplitude of the touch power circuit driving signal.

According to the present embodiment as described above, an interface for bidirectional communication between a touch control circuit and a touch power circuit of a touch sensing circuit is provided and a touch driving voltage can be amplified in a glove touch mode, whereby a signal to noise ratio (SNR) of the touch sensing circuit can be enhanced.

In addition, according to an embodiment, the touch driving voltage may change through the interface between the touch power circuit and the touch control circuit, and thus power usage of a display device can be reduced.

DETAILED DESCRIPTION OF THE EXEMPLARY EMBODIMENTS

Figure 1:
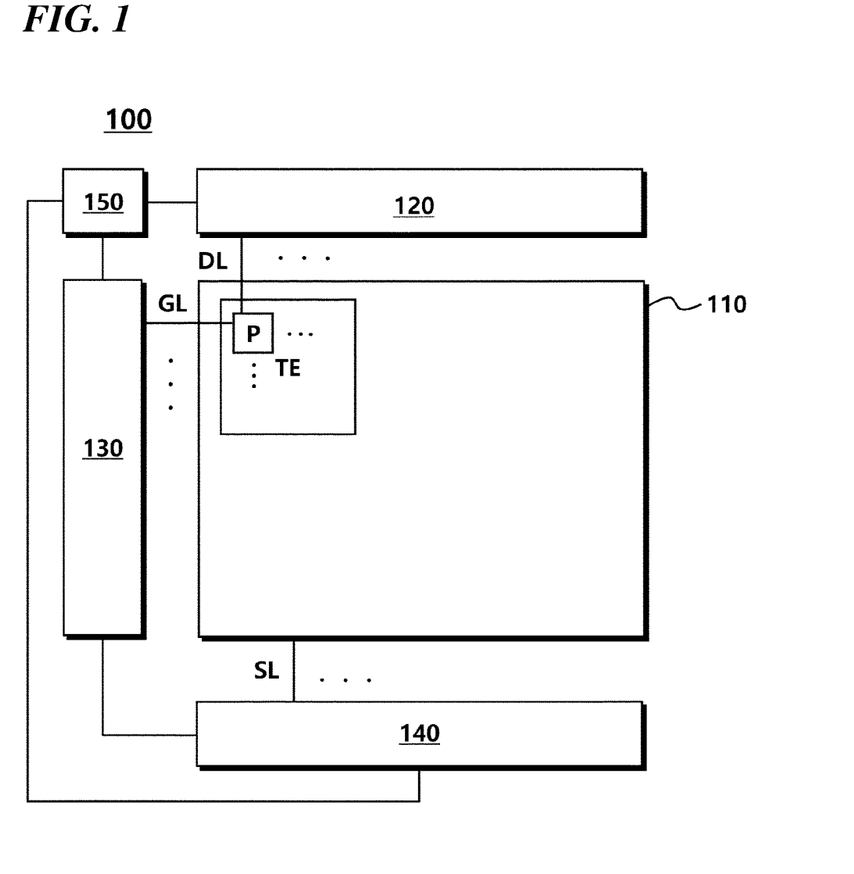
FIG. 1 illustrates a configuration of a display device according to an embodiment.

FIG. 1 illustrates a configuration of a display device according to an embodiment.

Referring to FIG. 1, a display device 100 may include a panel 110, a data driving circuit 120, a gate driving circuit 130, a touch sensing circuit 140, and a control circuit 150.

The panel 110 may include multiple data lines DLs connected to the data driving circuit 120 and multiple gate lines GLs connected to the gate driving circuit 130. In addition, multiple pixels Ps corresponding to intersections of the multiple data lines DLs and the multiple gate lines GLs may be defined.

Each pixel P may include a transistor for connecting a first electrode (for example, a source electrode or a drain electrode) to the date line DL, connecting a gate electrode to the gate line GL, and connecting a second electrode (for example, a drain electrode or a source electrode) to a display electrode.

In addition, each panel 110 may further include multiple touch electrodes TEs spaced apart from each other. In an area where the touch electrode TE is positioned, a single pixel P may be positioned and multiple pixels Ps may also be positioned.

The panel 110 may include a display panel and a touch panel (a touch screen panel (TSP)), wherein the display panel may share some components with the touch panel. For example, the multiple touch electrodes TEs may correspond to a component (for example, a common electrode for applying a common voltage) of the display panel, and may also correspond to a component (for example a touch electrode for sensing a touch) of the touch panel. Since some components are shared between the display panel and the touch panel, the panel 110 may be referred to as an integral panel, but the present disclosure is not limited thereto. In addition, an in-cell type panel is well known as a panel having a form in which some components are shared between the display panel and the touch panel, but is a mere example of the above-described panel 110, and a panel to which the present disclosure is applied is not limited to the in-cell type panel.

The data driving circuit 120 supplies a data signal to the data line DL in order to display an image on each pixel P of the panel 110.

The data driving circuit 120 may include at least one data driver integrated circuit, wherein the at least one data driver integrated circuit may be connected to a bonding pad of the panel 110 in a tape automated bonding (TAB) type or a chip on glass (COG) type, may be directly disposed on the panel 110, or, in some cases, may be integrally disposed on the panel 110. In addition, the data driving circuit 120 may be implemented in a chip on film (COF) type.

The gate driving circuit 130 sequentially supplies a scan signal to the gate line GL to turn on or off the transistor positioned in each pixel P.

According to a driving scheme, the gate driving circuit 130 may be positioned only at one side of the panel 110 as shown in FIG. 1, or may be divided into two parts and positioned at opposite sides of the panel 110.

In addition, the gate driving circuit 130 may include at least one gate driver integrated circuit, wherein the at least one gate driver integrated circuit may be connected to a bonding pad of the panel 110 in a tape automated bonding (TAB) type or a chip on glass (COG) type, may be implemented in a gate in panel (GIP) type to be directly disposed on the panel 110, or, in some cases, may be integrally disposed on the panel 110. In addition, the gate driving circuit 130 may be implemented in a chip on film (COF) type.

The touch sensing circuit 140 applies a driving signal to all or some of the multiple touch electrodes TEs connected to a sensing line SL.

The touch sensing circuit 140 may be disposed external to the data driving circuit 120 and the gate driving circuit 130 as a component separate from the data driving circuit 120 and the gate driving circuit 130 as shown in FIG. 1, but according to an implementation scheme, the touch sensing circuit 140 may be implemented as another separate internal component of a driver integrated circuit including at least one of the data driving circuit 120 and the gate driving circuit 130, or may be implemented as an internal component of the data driving circuit 120 or the gate driving circuit 130.

Accordingly, applying a driving signal to all or some of the multiple touch electrodes TEs by the touch sensing circuit 140 may also correspond to applying a driving signal to all or some of the multiple touch electrodes TEs by a separate driver integrated circuit including the touch sensing circuit 140. In addition, according to a design scheme, applying a driving signal to all or some of the multiple touch electrodes TEs by the touch sensing circuit 140 may also correspond to applying a driving signal to all or some of the multiple touch electrodes TEs by the data driving circuit 120 or the gate driving circuit 130 including the touch sensing circuit 140.

The touch sensing circuit 140 is not limited depending on the implementation and the design scheme, but as long as execution functions are identical or similar to those described in the present disclosure, the touch sensing circuit 140 may be another component itself, or may be a component positioned inside or outside of another component.

In addition, FIG. 1 shows that a single touch sensing circuit 140 is positioned on a display device 100, but the display device 100 may also include two or more touch sensing circuits 140.

In order for the touch sensing circuit 140 to apply a driving signal to all or some of the multiple touch electrodes TEs, a sensing line SL connected to each of the multiple touch electrodes TEs is needed. Accordingly, a sensing line SL which is connected to each of the multiple touch electrodes TEs and transfers a driving signal may be disposed on the panel 110 in a first direction (e.g., a longitudinal direction) or in a second direction (e.g., a transverse direction).

The display device 100 may adopt a capacitive touch scheme of recognizing a touch or the proximity of an object by sensing a change in capacitance through a touch electrode TE.

The capacitive touch scheme may be divided into, for example, a mutual-capacitance touch scheme and a self-capacitance touch scheme.

A mutual-capacitance touch scheme corresponding to one of the capacitive touch schemes applies a driving signal to one touch electrode (Tx electrode) and senses another touch electrode (Rx electrode) coupled to the Tx electrode. In the mutual-capacitance touch scheme, a value sensed at the Rx electrode changes according to the touch or the proximity of an object such as a finger and a pen, and in the mutual-capacitance touch scheme, a sensing value at the Rx electrode is used to detect whether or not a touch is input, touch coordinates, and the like.

A self-capacitance touch scheme corresponding to one of the capacitive touch schemes applies a driving signal to one touch electrode TE and then senses the corresponding touch electrode TE again. In the self-capacitance touch scheme, a value sensed at the corresponding touch electrode TE changes according to the touch or the proximity of an object such as a finger and a pen, and in the self-capacitance touch scheme, the sensing value is used to detect whether or not a touch is input, touch coordinates, and the like. In the self-capacitance touch scheme, the touch electrode TE for applying a driving signal is identical to the touch electrode TE for sensing, and thus the Tx electrode and the Rx electrode are not distinguished from each other.

The display device 100 may adopt one of two capacitive touch schemes described above (the mutual-capacitance touch scheme and the self-capacitance touch scheme). However, for convenience of description, an embodiment is described under the assumption that the self-capacitance touch scheme is adopted.

The display device 100 may drive the touch electrode TE by distinguishing a display interval from a touch interval. In an example, the touch sensing circuit 140 of the display device 100 may not apply a driving signal to all or some of the touch electrodes TEs in an interval at which a data signal is supplied.

In addition, the display device 100 may drive the touch electrode TE by not distinguishing a display interval from a touch interval. In an example, the touch sensing circuit 140 of the display device 100 may apply a driving signal to all or some of the touch electrodes TE in an interval at which a data signal is supplied.

The control circuit 150 may supply various control signals to the data driving circuit 120, the gate driving circuit 130, and the touch sensing circuit 140. The control circuit 150 may transmit a data control signal (DCS) for controlling the data driving circuit 120 to supply a data voltage according to each timing, may transmit a gate control signal (GCS) to the gate driving circuit 130, or may transmit a sensing signal to the touch sensing circuit 140. The control circuit 150 may be a timing controller (T-Con) or may perform other control functions including the function of the timing controller.

Figure 2:
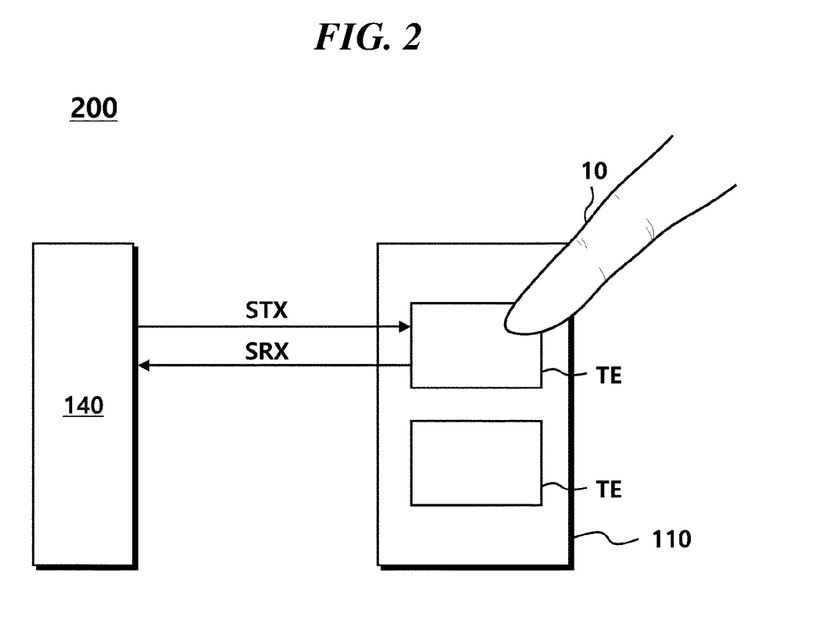
FIG. 2 illustrates a touch sensing process according to an embodiment.

FIG. 2 illustrates a touch sensing process according to an embodiment.

Referring to FIG. 2, a touch sensing system 200 may include a panel 110 and a touch sensing circuit 140.

Multiple touch electrodes TEs may be arranged on the panel 110.

The touch sensing circuit 140 may supply a driving signal STX to a touch electrode TE. The driving signal STX may be a voltage- or a current-type signal, and the voltage-type driving signal STX may be defined as a driving voltage. The driving signal may include one driving period including a first period and a second period.

The touch sensing circuit 140 may receive a response signal SRX to a driving signal STX from a touch electrode TE, and demodulate the response signal SRX to sense the touch or the proximity of an object 10 on or to the panel 110. The response signal SRX may be a current- or a voltage-type signal.

The size of a capacitance formed between a touch electrode TE and an object 10 may vary according to the state of the panel 110, such as a case when a glass is attached on a surface of the panel 110, and, even if driving signals STX of a same size are transmitted, sizes of response signals SRX may be different.

Figure 3:
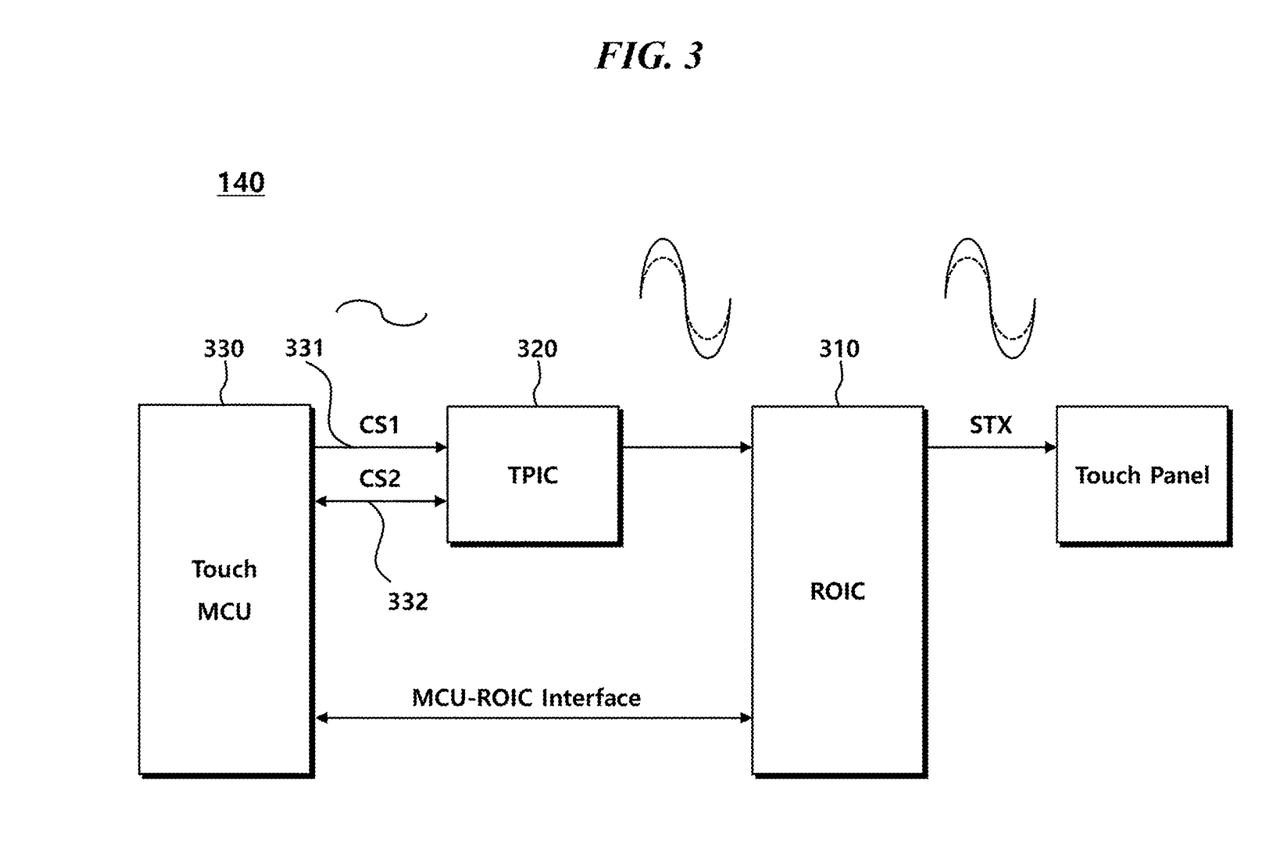
FIG. 3 is a block diagram of a touch sensing circuit according to an embodiment.

FIG. 3 a block diagram of a touch sensing circuit according to an embodiment.

Referring to FIG. 3, the touch sensing circuit 140 may include a readout circuit 310, a touch power circuit 320, and a touch control circuit 330.

The readout circuit 310 may supply a driving signal STX having a constant amplitude, for example, a driving voltage, to a touch electrode. The driving signal STX and the response signal SRX may be a square-wave signal or a sine-wave signal.

The readout circuit 310 may drive the touch electrode by using a driving signal STX having another amplitude. A driving circuit (not shown) included in the readout circuit 310 may receive a driving signal STX having a changed amplitude from the touch control circuit 330, and change touch sensitivity by driving the touch electrode with the changed amplitude. In addition, a sensing circuit (not shown) included in the readout circuit 310 may sense a touch or the proximity of an external object on or to the panel by receiving a response signal SRX to the driving signal STX from the touch electrode. The sensing circuit (not shown) may generate touch sensing data, for example, a touch sensing value, by demodulating the response signal SRX.

The readout circuit 310 may include a synchronous rectification integrated circuit (SRIC) including a source driver integrated circuit (SDIC), as necessary.

The touch power circuit 320 may generate various power signals including a reference voltage signal and a driving voltage required to drive the panel 110 and supply the same to the readout circuit 310, the touch control circuit 330, and the like. The touch power circuit 320 may be defined as a touch power integrated circuit (TPIC) as necessary.

The touch power circuit 320 may amplify or reduce a driving signal transferred from the touch control circuit 330, and may transfer the amplified driving signal to the readout circuit 310.

According to a conventional touch circuit, since no interface is comprised between the touch control circuit 330 and the touch power circuit 320 and the touch control circuit 330 does not directly control the amplitude of a signal outputted from the touch power circuit 320, the amplitude of a signal transmitted to the readout circuit 310 cannot be efficiently controlled.

The touch power circuit 320 changes the amplitude of an output signal to correspond to a control signal CS1, CS2 of the touch control circuit 330 without comprising an integrated circuit for calculation therein. For this reason, the touch power circuit 320 may have a simplified structure and improve the speed of processing a signal.

In a case when the touch sensitivity of the panel (not shown) decreases, the touch power circuit 320 may receive a control signal to increase the amplitude of an output signal of the touch power circuit 320 from the touch control circuit 330 and change the output signal in order to compensate for the touch sensitivity of the panel.

The readout circuit 310 or the touch power circuit 320 may control the amplitude of a driving signal of a sine wave type by adjusting a feedback resistance rate. For example, a signal passing through the readout circuit 310 or the touch power circuit 320 may pass through an amplifier (not shown) and a ratio of a signal outputted from the amplifier to a signal inputted into the amplifier can be defined according to the feedback resistance rate of the amplifier. A feedback resistance of the amplifier may be changed to correspond to a control signal of the touch control circuit 330.

The touch control signal 330 may generate a control signal CS to control the readout circuit 310 and the touch power circuit 320. When the touch control circuit 330 transfers the control signal CS to the readout circuit 310 and the touch power circuit 320, the driving circuit (not shown) and the sensing circuit (not shown) may operate according to the control signal CS.

For example, when the touch control circuit 330 transfers a control signal CS which amplifies or reduces a driving voltage to the readout circuit 310 or the touch power circuit 320, the readout circuit 310 or the touch power circuit 320 may amplify or reduce the driving voltage in response to the control signal CS.

The touch control circuit 330 may have an interface connected to the readout circuit 310 and an interface connected to the touch power circuit 320. An interface may be defined as a structure or a method of connection between the aforementioned at least one circuit for data communication or a signal transmission. For example, an interface may be defined as a physical element formed between the aforementioned circuits or a protocol for communication between the aforementioned circuits.

The interface connected between the touch control circuit 330 and the readout circuit 310 or the interface connected between the touch control circuit 330 and the touch power circuit 320 may perform communication according to an inter-integrated circuit (I2C) scheme.

An I2C bus may operate in a master-slave form including bidirectional open drain lines, a serial clock (SCL) line and a serial data (SDA) line. The SCL line may be a clock line for synchronization of communication, and the SDA line may control each touch signal as a data line.

The conventional touch control circuit has a problem in that a single interface for transferring a pre-configured driving signal to a readout circuit or a power circuit is provided, and thus the amplitude of a driving circuit cannot be increased or decreased according to the type of a touch input. For example, the conventional single interface between the touch control circuit and the power circuit can transfer a reference voltage only, but cannot transfer a control signal at the driving voltage.

By adding an interface between the touch control circuit 330 and the touch power circuit 320, a driving signal or a control signal according to the type of the touch input, the type being determined by the touch control circuit 330, may be transferred to the touch power circuit 320. For example, the interface between the touch control circuit 330 and the touch power circuit 320 may include a bidirectional communication port defined as inter-integrated circuit (I2C)-type communication so as to transmit or receive a driving signal or a control signal according to the type of the touch input.

A first interface 331 and a second interface 332 may be connected to the touch control circuit 330 and the touch power circuit 320. The first interface 331 may transmit or receive a signal CS1 including information relating to the level of a driving signal. The second interface 332 may transmit or receive a signal CS2 including the type of the touch input as necessary.

The touch sensing circuit according to an embodiment may be applied to a circuit or a panel for a vehicle display so as to allow a relatively efficient use of power. Since a display panel for a vehicle, unlike a panel for a smartphone, uses a thick glass and the size of its panel nodes is enlarged, an efficient use of power is necessary.

The touch control circuit 330 may supply only driving power through the touch power circuit 320, and control the amplitude of a driving signal through the readout circuit 310. In this case, there is no need for the timing controller (T-CON) to have an additional interface connected to the power circuit, and may control the driving signal only with the connection to the readout circuit 310.

The interface according to an embodiment may be defined by a connection method between multiple systems, and may be defined by a hardware configuration, for example, a communication port, etc., or by a protocol according to a software communication method.

Figure 4:
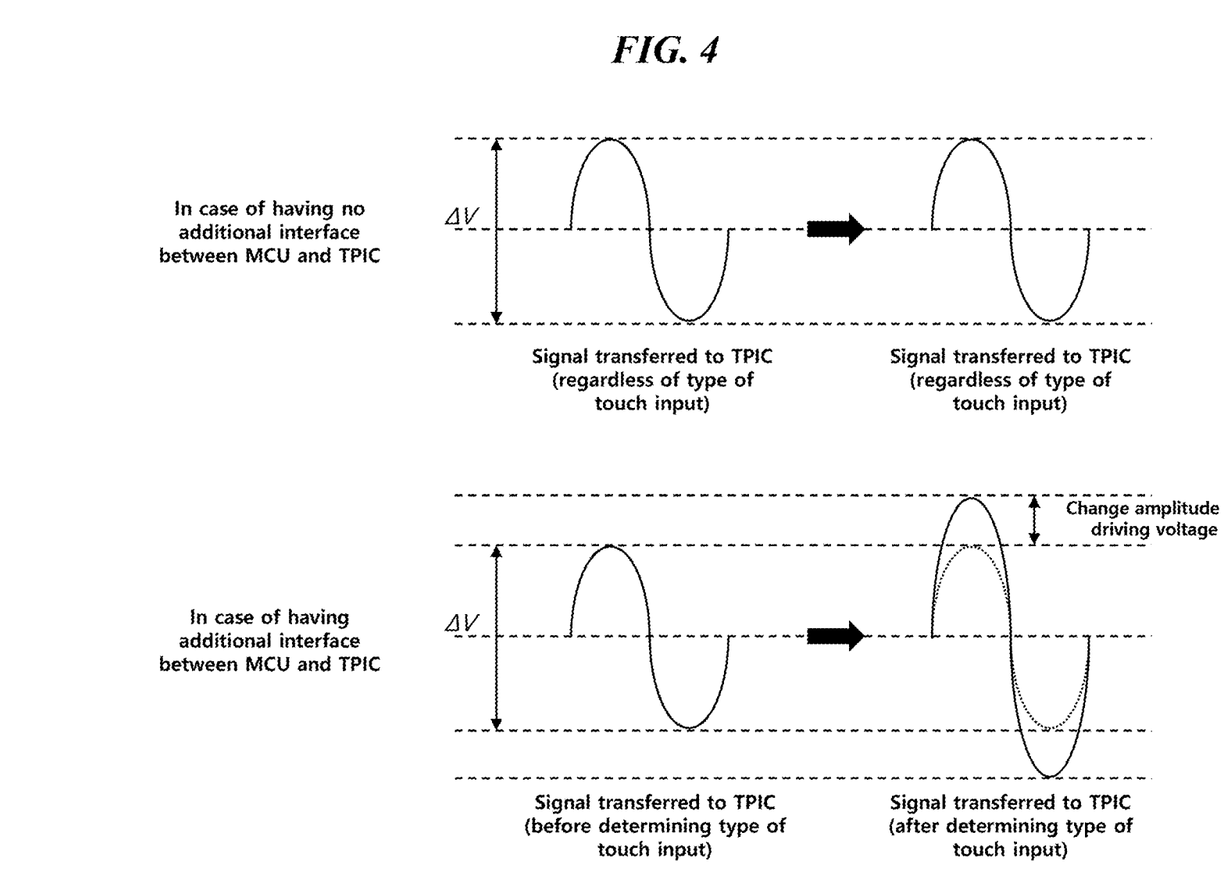
FIG. 4 illustrates a change in a driving voltage in a case in which an interface is added between a microcontroller and a touch power circuit according to an embodiment.

FIG. 4 illustrates a change in a driving voltage in a case in which an interface is added between a microcontroller and a touch power circuit according to an embodiment.

FIG. 4 shows a change in a driving voltage in a case in which an additional interface between a microcontroller (or a micro controller unit, MCU) and a touch power integrated circuit (TPIC) is provided.

The conventional touch sensing circuit does not include an additional interface between the microcontroller (MCU) and the touch power integrated circuit (TPIC), and thus a signal transferred to the touch power integrated circuit (TPIC) cannot be controlled even when a touch input changes.

In the conventional touch sensing circuit, the touch power integrated circuit (TPIC) cannot acquire information relating to the type of the touch input, and thus the amplitude of the output driving signal is maintained even when the type of the touch input changes. In this case, the amplitude ($\Delta V$) of the driving voltage is constantly maintained.

The touch sensing circuit 140 according to an embodiment includes an additional interface between the microcontroller (MCU) and the touch power integrated circuit (TPIC), and may thus control a driving signal output from the touch power integrated circuit (TPIC), according to the change in the type of the touch input.

When data of a touch with low sensitivity is maintained for a predetermined frame in the microcontroller (MCU), the touch sensing circuit 140 according to an embodiment may determine the touch as a glove touch. The microcontroller (MCU) may transfer a control signal to the touch power integrated circuit (TPIC) to increase the sensitivity of the touch by increase the amplitude of the driving voltage of the touch power integrated circuit (TPIC). In response to the control signal transferred from the microcontroller (MCU), the amplitude of the driving signal of the touch power integrated circuit (TPIC) may change. For example, when the type of the touch input changes from a normal touch mode to a glove touch mode, the magnitude of the amplitude ($\Delta V$) may be amplified.

The touch sensing circuit 140 according to an embodiment includes an additional interface between the MCU and the TPIC so that the microcontroller (MCU) can determine the type of the touch input, and the touch power integrated circuit (TPIC) can receive the type of touch input, and thus touch sensitivity can be more effectively adjusted by changing the amplitude of the driving voltage.

The microcontroller (MCU) according to an embodiment may determine the type of the touch input as a glove touch and may increase the amplitude of the driving signal through the second interface 332. A microcontroller (MCU) according to another embodiment may determine the type of the touch input as a normal touch and may decrease the amplitude of the driving signal through the second interface 332.

Figure 5:
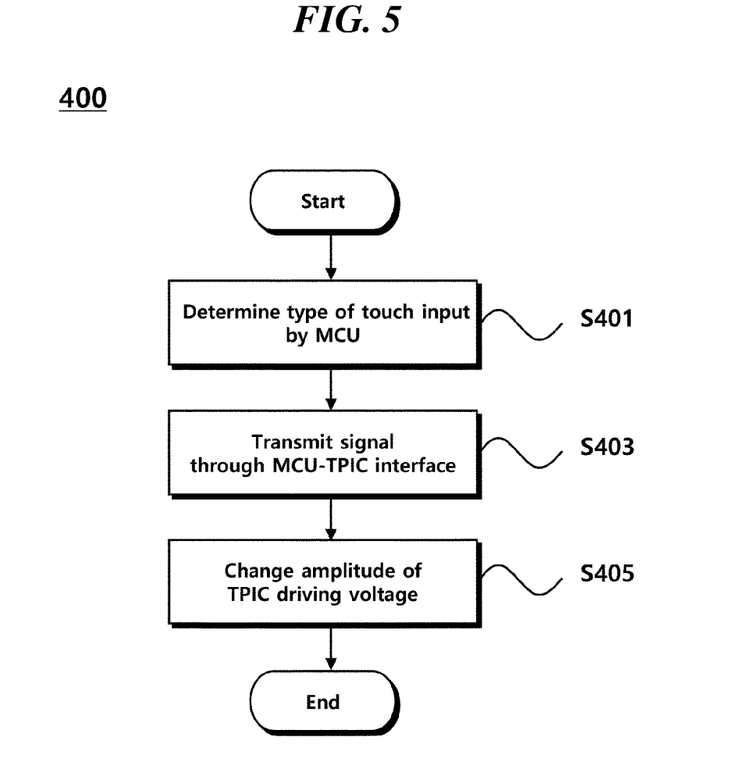
FIG. 5 is a first exemplary flow chart illustrating a controlling method for touch sensitivity enhancement of a display device according to an embodiment.

FIG. 5 is a first exemplary flow chart illustrating a controlling method for touch sensitivity enhancement of a display device according to an embodiment.

Referring to FIG. 5, a controlling method 400 for touch sensitivity enhancement of a display device may include the operations of: determining a type of a touch input (S401), transmitting a signal through an MCI-TPIC interface (S403); and changing the amplitude of a TIPC driving voltage (S405).

In operation S401 of determining the type of the touch input, the type of the touch input may be determined through a microcontroller (MCU).

The readout circuit 310 may apply a driving signal STX having a predetermined period and amplitude to each of multiple electrodes of a touch panel and receive a response signal SRX. The readout circuit 310 may detect whether there is a touch input through the response signal SRX based on a change in capacitance and determine the strength of the touch input.

The touch control circuit 330 may define, as a reference value or an offset, touch nonoccurrence data indicating the nonoccurrence of a touch input, determine, as occurrence of a touch, a touch sensing value equal to or greater than a predetermined size, and determine, as occurrence of a glove touch, a touch sensing value within a predetermined range.

The touch control circuit 330 may define different types of touch inputs according to the size of an area of the touch input. The touch control circuit 330 may determine a touch as a stylus pen touch or a noise when the touch is input in a touch input area or radius smaller than a reference value, with reference to a pre-configured touch input area or radius, and may determine a touch as a normal finger touch or a glove finger touch when the touch is input in a touch input area or radius equal to or greater than the reference value.

The touch control circuit 330 may determine the type of the touch input and adjust touch sensitivity by controlling a driving signal of the touch panel according to the type of the touch input.

In operation S403 of transmitting a signal through an MCU-TPIC interface, a driving signal or a control signal may be transmitted through an interface disposed between the microcontroller (MCU) or the touch power integrated circuit (TPIC).

The touch control circuit 330, for example, the microcontroller (MCU), may determine the type of the touch input for each configured frame period and generate a driving signal change control signal according to whether the type of the touch input is changed and the type of the changed touch input.

When multiple interfaces are arranged between the microcontroller (MCU) and the touch power integrated circuit (TPIC), some interfaces may transmit or receive a reference signal, for example, a reference voltage of the driving signal, the type of the driving signal, and a switching timing of the driving signal. Some other interfaces may transmit or receive a control signal, for example, a driving voltage amplitude change signal.

In addition, an interface between the microcontroller (MCU) and the touch power integrated circuit (TPIC) may be defined as an MCU-TPIC interface.

The touch power integrated circuit (TPIC) may receive both a reference signal and a control signal from the microcontroller (MCU) through multiple interfaces connected between the MCU and the TPIC.

Since the touch power integrated circuit (TPIC) may receive a reference signal and a control signal respectively through different interfaces, interference between a reference signal and a control signal may be reduced.

In addition, a time interval at which a reference signal is transmitted from the microcontroller (MCU) to the touch power integrated circuit (TPIC) may be identical to or different from a time interval at which a control signal is transmitted from the microcontroller (MCU) to the touch power integrated circuit (TPIC). This may mean that a reference signal and a control signal are driven independently from each other.

The touch power integrated circuit (TPIC) may receive a control signal from the microcontroller (MCU) through an interface for bidirectional communication and change the amplitude of an output signal transmitted to the readout circuit (ROIC).

Information relating to the type of the touch input, for example, a normal touch mode or a glove mode, the type being determined by the touch control circuit, may be transferred through the MCU-TPIC interface.

The type of the touch input may be determined in consideration of a touch sensing value received from the readout circuit 310, a configured reference value, and a configured reference time.

In operation S405 of changing the amplitude of the TPIC driving voltage, the amplitude of a driving voltage of the touch power integrated circuit (TPIC) may change on the basis of a control signal transferred through the MCU-TPIC interface.

In the glove mode, capacitance generated between an object and a touch electrode decreases, and thus the touch sensitivity may increase as the amplitude of the driving voltage increases.

In the normal touch mode, no separate external object exists between the object and the touch electrode, the touch sensitivity may be maintained as the amplitude of the driving voltage decreases lower than that in the glove mode, whereby the power usage can be reduced. As the amplitude of the driving voltage of the touch power integrated circuit (TPIC) decreases, the power usage of the display device can be reduced.

The glove mode and the normal touch mode may be determined by considering the intensity of a touch, the interval between touches, etc. The intensity of an output signal of the touch power integrated circuit (TPIC) in the glove mode and the intensity of an output signal of the touch power integrated circuit (TPIC) in the normal touch mode may be different from each other.

Figure 6:
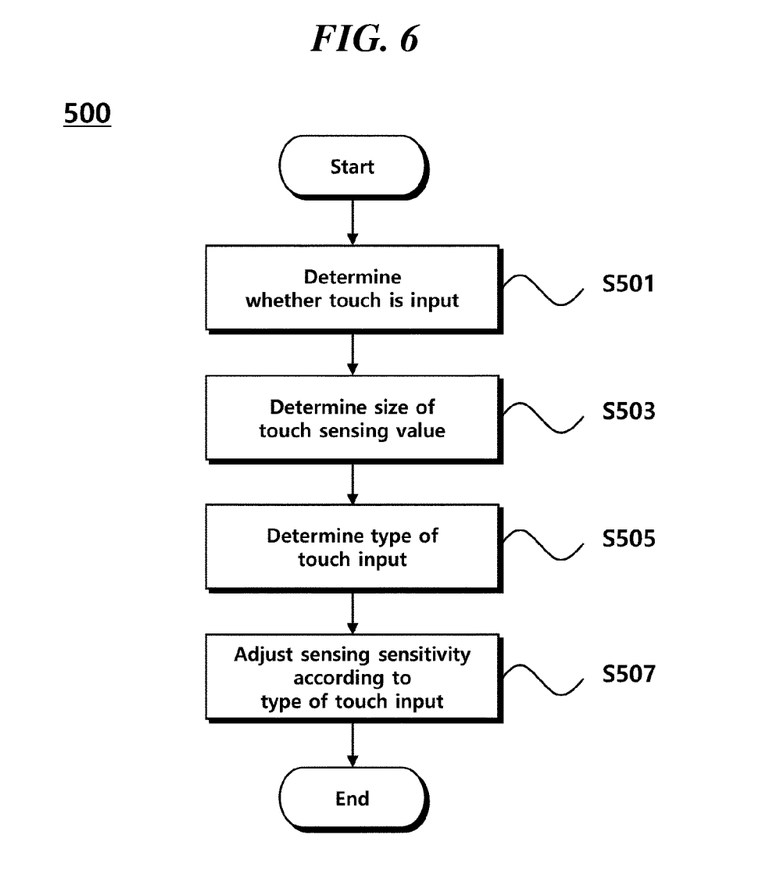
FIG. 6 is a second exemplary flow chart illustrating a controlling method for touch sensitivity enhancement of a display device according to an embodiment.

FIG. 6 is a second exemplary flow chart illustrating a controlling method for touch sensitivity enhancement of a display device according to an embodiment.

Referring to FIG. 6, a controlling method 500 for touch sensitivity enhancement of a display device may include the operations of: determining whether there is a touch input (S501); determining the size of a touch sensing value (S503); determining the type of the touch input (S505); and adjusting the sensitivity according to the type of the touch input (S507).

In operation S501 of determining whether there is a touch input, when a predetermined ratio or size of a change in touch data from offset data is identified on the basis of touch data received from the readout circuit 310, whether a touch is input may be determined.

For example, an average of offset data pieces for a predetermined frame may be compared with an average of touch data pieces for the next frame so as to calculate a ratio of the change in the touch data. In another example, when the size of the touch data received for the predetermined frame is equal to or greater than a reference value, it may be determined that a touch is input.

The microcontroller (MCU) may calculate the change amount and the change rate of touch data of each frame and generate compensation data for compensating for the change amount and the change rate. The compensation data may be data to change the intensity of an output signal of the touch power integrated circuit (TPIC).

In addition, the microcontroller (MCU) may calculate the change amount and the change rate of touch data of a time section in a frame and generate compensation data for compensating for the change amount and the change rate. In this case, the intensity of an output signal of the touch power integrated circuit (TPIC) may be changed in real time to correspond to the data operation speed of the microcontroller (MCU).

In operation S503 of determining the size of the touch sensing value, the touch sensing value may be calculated by converting an analog signal received from the readout circuit 310 into a digital signal. The measured touch sensing value may be calculated for each frame and each touch electrode and may be stored in a memory (not shown), and the size of the touch sensing value of each frame and each touch electrode may be compared with a reference value.

In operation S505 of determining the type of the touch input, the touch control circuit 330 may determine the type of the touch input by receiving the calculated touch sensing value from the readout circuit 310.

When the size of the touch sensing value is equal to or greater than a pre-configured reference value, the state of the touch may be determined as a normal touch state, and the touch control circuit 330 may maintain the normal touch mode state or change the state to the normal touch mode state.

When the size of the touch sensing value is equal to or smaller than the pre-configured reference value, the state of the touch may be determined as a glove touch state or a touch nonoccurrence state. When the size of the touch sensing value is within the pre-configured reference range, the state of the touch may be determined as a glove touch state, and the touch control circuit 330 may maintain the glove touch mode state or change the state to the glove touch mode state. The touch control circuit 330 may determine the state as a touch nonoccurrence state when the size of the touch sensing value is within a predetermined range from offset data or is equal to or smaller than the reference value.

In order to determine the type of the touch input, the type of the touch input for each frame may be determined, but a touch input for a predetermined reference frame may be sensed to determine the type of the touch input.

For example, when a touch with low sensitivity is maintained for a predetermined frame or longer, the touch control circuit may enter a glove touch mode.

In operation S507 of adjusting the sensitivity according to the type of the touch input, the sensitivity of the touch panel may be adjusted according to the type of the touch input.

In general, the sensitivity increases according to the size of the driving signal transferred to the touch panel, but may be defined in different ways as necessary.

In the touch nonoccurrence state, the size of the driving signal transferred to the touch panel may be decreased so that the touch panel can be driven with the minimum power only, and in the normal touch state, the touch panel may be driven by transferring a reference driving signal.

In the glove touch, because a physical distance between an object and a touch electrode increases by an external object, capacitance generated at the touch electrode decreases. Accordingly, to maintain the same touch strength, the amplitude of the driving signal transferred to the touch electrode is to be increased so that the touch sensitivity is increased, and thus, in the glove touch mode, the amplitude of the driving signal may be increased through an interface connected to the touch control circuit and the readout circuit or the amplitude of the driving signal may be increased through an interface connected to the touch control circuit and the voltage circuit.

The touch sensitivity may be adjusted by transferring the control signal according to the type of the touch, determined by the touch control circuit 330, to the readout circuit 310 or the voltage circuit 320.

The touch control circuit 330 may calculate the change amount of the touch driving signal to be increased by the readout circuit 310 in order to compensate for the decrement in capacitance and regularly update the decrement in capacitance and the increment in the touch driving signal intensity.

The touch control circuit 330 may calculate the change amount of the output signal to be increased by the touch power integrated circuit 320 for the change of the touch driving signal to be increased by the readout circuit 310 and transfer a control signal to control the output signal of the touch power integrated circuit 320 through a communication interface between the touch control circuit 330 and the touch power integrated circuit 320.

Figure 7:
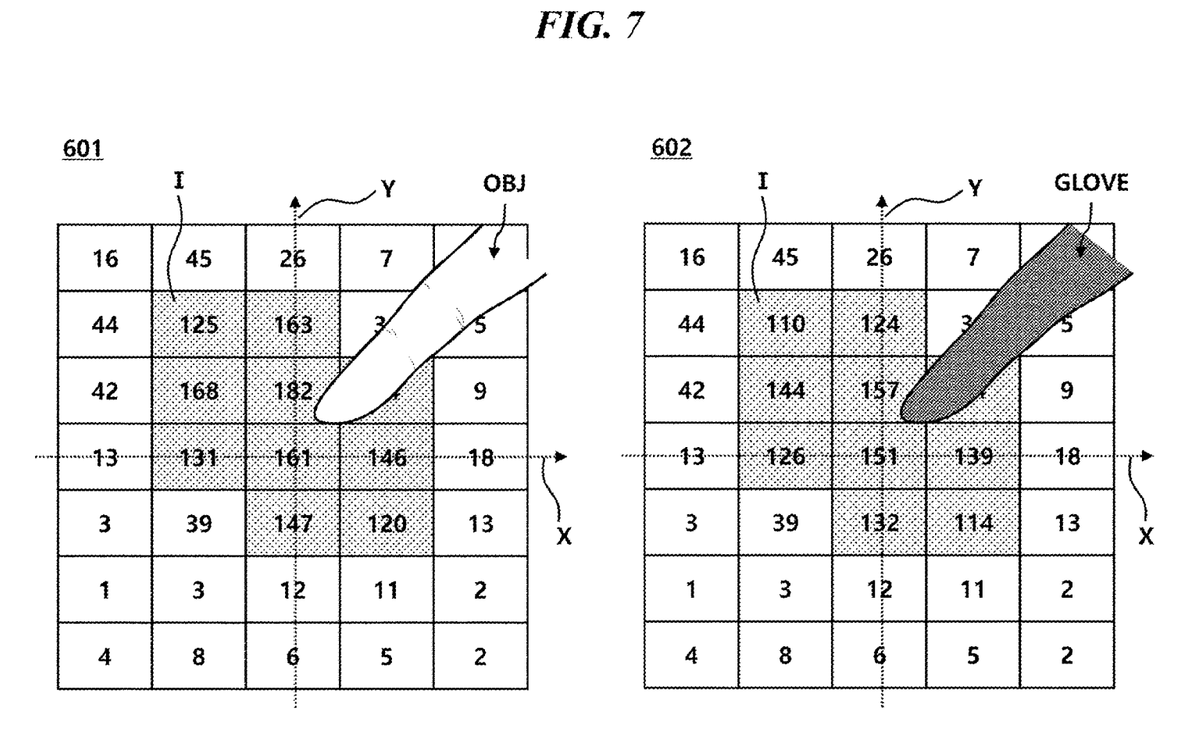
FIG. 7 illustrates a change in a touch sensing value of a glove touch according to an embodiment.

FIG. 7 illustrates a change in a touch sensing value of a glove touch according to an embodiment.

Referring to FIG. 7, a change in a touch sensing value from a touch sensing value 601 in a normal touch state to a touch sensing value 602 in a glove touch state may be compared.

A touch sensing value for each touch electrode or each area of a touch panel defined by the x axis and the y axis may be acquired. An area having a touch sensing value equal to or greater than a reference value may be defined as an area (I) where a touch is input.

For example, even though a touch sensing value 601 in the area (I) where the touch is input in the normal touch state is measured as 125, 163, 168, 182, 131, 161, 146, 147, and 120, a touch sensing value 602 in the area (I) where the touch is input in the glove touch state may be measured as 110, 124, 144, 157, 126, 151, 139, 132, and 114.

For the touch sensing value in the area (I) where in the touch is input according to the type of the touch input, an individual value of each touch electrode or each area may be used, but an average of corresponding values may also be used.

Figure 8:
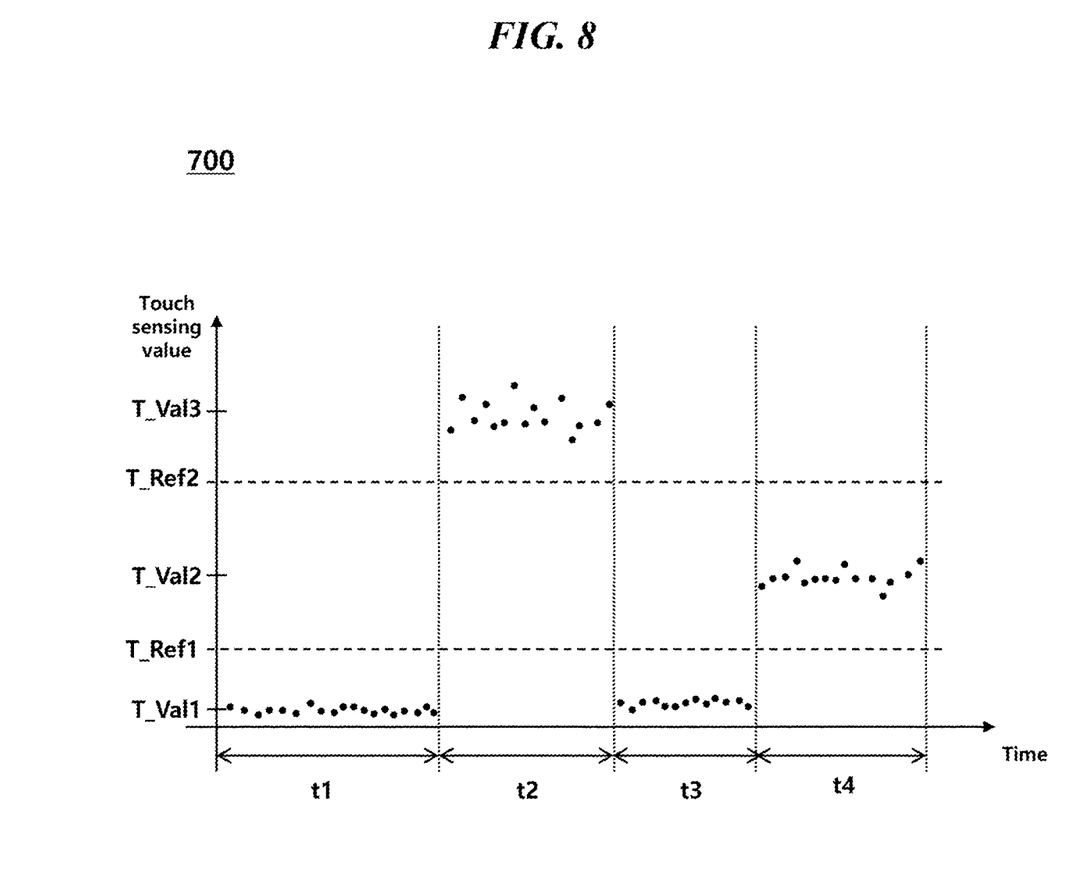
FIG. 8 illustrates an example of a change in a touch sensing value over time in a touch sensing circuit according to an embodiment.

FIG. 8 illustrates an example of a change in a touch sensing value over time in a touch sensing circuit according to an embodiment.

Referring to FIG. 8, a graph 700 showing a change in a touch sensing value over time in a touch sensing circuit may include a touch sensing value T_Val1 in a touch nonoccurrence state, a touch sensing value T_Val2 in a glove touch state, and a touch sensing value T_Val3 in a normal touch state.

For example, the touch sensing value according to an embodiment is defined as an average touch sensing value in each area, and a method for calculating a touch sensing value used in the actual driving process is not limited thereto.

The touch sensing value T_Val1 measured during the first touch driving period t1 may correspond to a touch sensing value calculated in the touch nonoccurrence state.

The touch sensing value T_Val3 measured during the second touch driving period t2 may correspond to a touch sensing value calculated in the normal touch state. The touch control circuit 330 may determine, as necessary, the state of a touch as a normal touch state when the touch having a touch sensing value equal to or greater than a reference value T_Ref2 is maintained for a predetermined frame or longer.

The touch sensing value T_Val1 measured during the third touch driving period t3 may correspond to a touch sensing value that is identical to the touch sensing value measured during the first touch driving period t1, or a touch sensing value calculated in the touch nonoccurrence state, which is within a predetermined range on the basis of the touch sensing value measured during the first touch driving period t1.

The touch sensing value T_Val2 measured during the fourth touch driving period t4 may correspond to a touch sensing value calculated in the glove touch state. The touch control circuit 330 may determine, as necessary, the state of a touch as a glove touch state when the touch having a touch sensing value smaller than a reference value T_Ref2 is maintained for a predetermined frame or longer. For more accurate determination, the touch control circuit 330 may determine the state of a touch as a glove touch state when the touch having a touch sensing value between a reference value T_Ref1 and the reference value T_Ref2 is maintained for a predetermined frame or longer. The reference range may be defined, as necessary, as the range of a sensing value equal to or greater than the reference value T_Ref1 and a sensing value equal to or smaller than the reference value T_Ref2.

In order to determine the glove touch state, the touch control circuit 330 may determine whether the touch sensing value between the reference value T_Ref1 and the reference value T_Ref2 is maintained for a predetermined frame.

Figure 9:
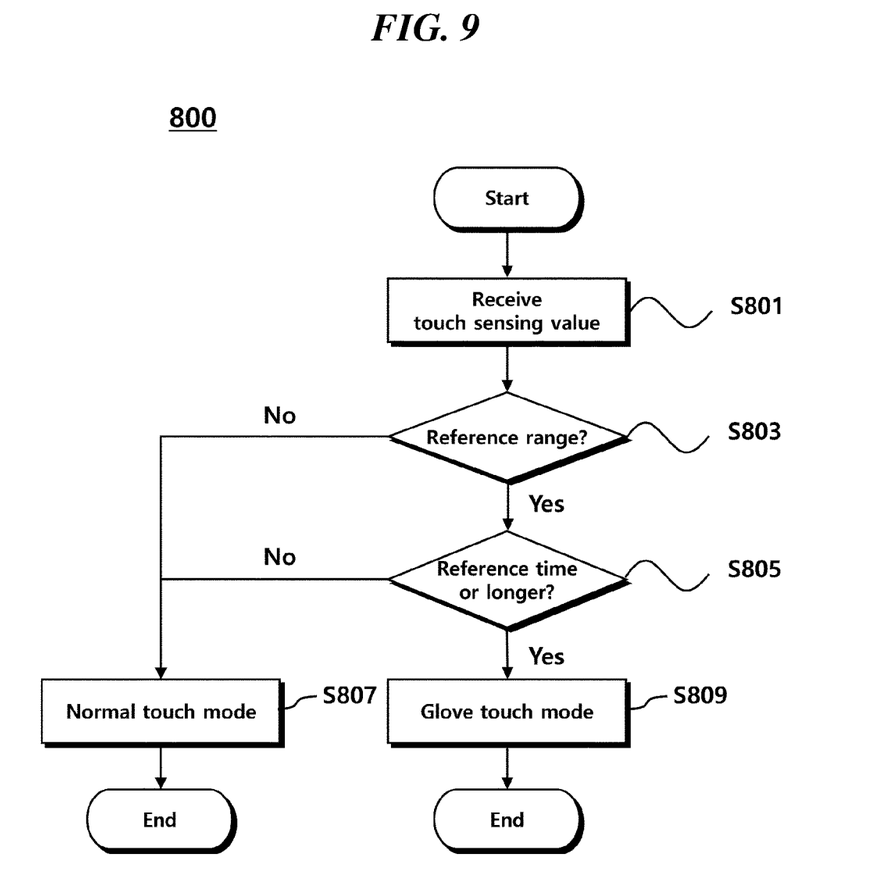
FIG. 9 is a first exemplary flow chart illustrating a method for determining the type of a touch input by a touch sensing circuit according to an embodiment.

FIG. 9 is a first exemplary flow chart illustrating a method for determining the type of a touch input by a touch sensing circuit according to an embodiment.

Referring to FIG. 9, a method 800 for determining the type of a touch input by a touch sensing circuit may include the operations of: receiving a touch sensing value (S801); determining whether the touch sensing value is within a reference range (S803); and determining whether the touch sensing value is maintained for a reference time (S805).

In operation S801 of receiving a touch sensing value, a change in capacitance of a touch electrode may be received through the readout circuit 310 and an analog signal may be converted into a digital signal. A touch signal may be finally acquired as a touch sensing value.

In operation S803 of determining whether the touch sensing value is within a reference range, the touch control circuit 330 may identify the size of the touch sensing value received from the readout circuit 310 so as to determine whether the touch sensing value is included in a reference range.

The touch control circuit 330 may determine a touch as a candidate touch of a glove touch when the touch has a touch sensing value within the reference range, and may define the mode of the touch as a normal touch mode when the touch has a touch sensing value departing the reference range.

In operation S805 of determining whether the touch sensing value is maintained for a reference time, the touch control circuit 330 may identify a change in a touch sensing value received from the readout circuit 310 so as to determine whether the touch is maintained for a reference time.

The touch control circuit 330 may determine the mode of the touch as a glove touch mode (S809) only when the touch sensing value within the reference range is maintained for the reference time or longer, and when there is a change in the touch sensing value within the reference time, the touch control circuit 330 may determine the change as a temporary touch change and define the mode of the touch as a normal touch mode (S807).

Figure 10:
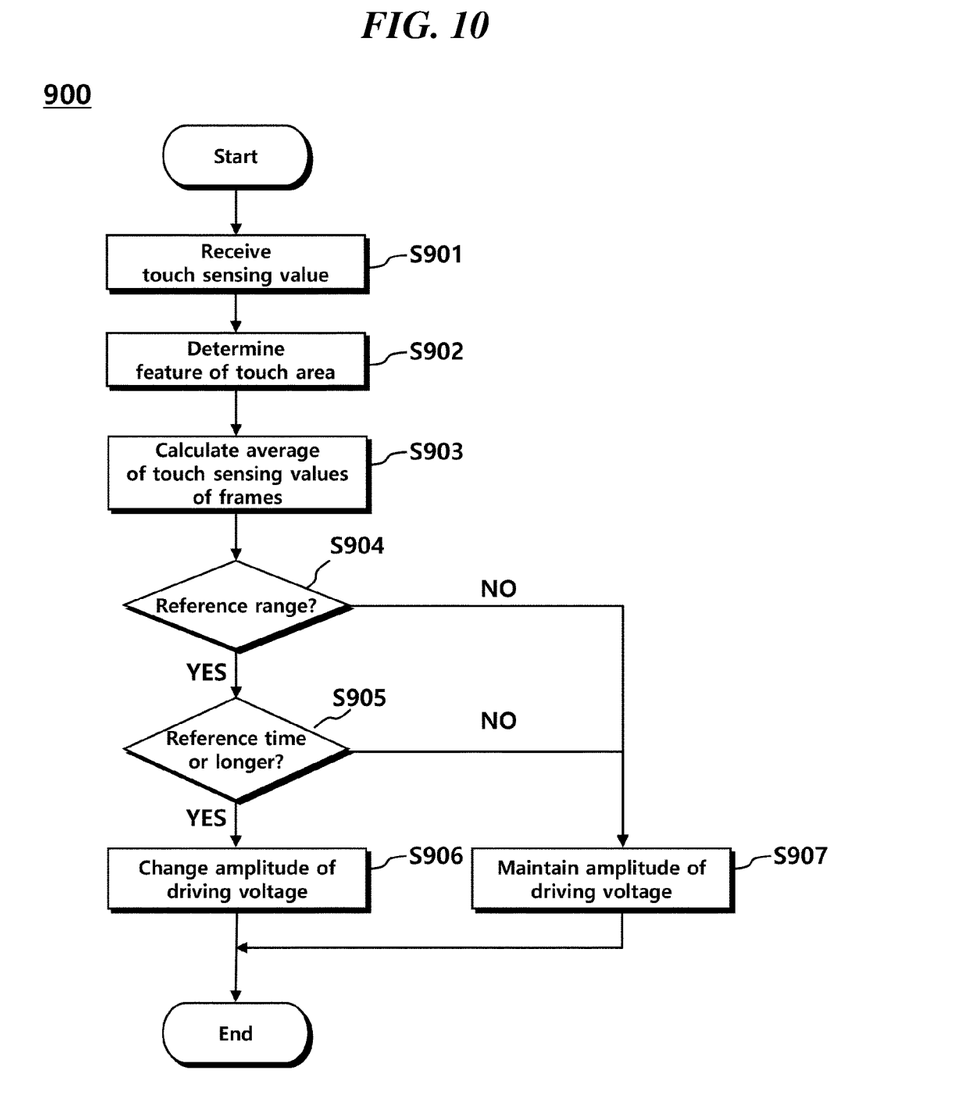
FIG. 10 is a second exemplary flow chart illustrating a method for determining the type of a touch input by a touch sensing circuit according to an embodiment.

In the normal touch mode (S807) and the glove touch mode (S809), the touch sensing circuit may control a driving signal according to the type of the touch input as described with reference to FIGS. 3 to 8 above. FIG. 10 is a second exemplary flow chart illustrating a method for determining the type of a touch input by a touch sensing circuit according to an embodiment.

Referring to FIG. 10, a method 900 for determining the type of a touch input by a touch sensing circuit may include the operations of: receiving a touch sensing value (S901); determining a feature of a touch area (S902); calculating an average of touch sensing values between frames (S903); determining whether the touch sensing value is within a reference range (S904); and determining whether the touch sensing value is maintained for a reference time (S905).

In performing operation S901 of receiving a touch sensing value, the above-described method in FIG. 8 may be used.

In operation S902 of determining a feature of a touch area, the size of a touch area may be determined on the basis of the touch sensing value. When a touch is input in a touch area smaller than a predetermined reference area, it may be defined that there is no touch input or a touch is input by a stylus pen, and whether a glove touch is input may be determined when a touch is input in a touch area equal to or larger than the predetermined reference area.

In operation S903 of calculating an average of touch sensing values between frames, an average of touch sensing values for a configured frame may be calculated. A change in a touch sensing value in each frame may be measured by using the average of touch sensing values in each frame, but an average of touch sensing values for a reference touch frame, for example, N frames (N is a natural number equal to or larger than 2), may be used to determine the type of the touch input.

Instead of the average of the touch sensing values between frames, a representative value may be calculated to determine the type of the touch input, as necessary, wherein the representative value may be defined as a touch sensing value that is most frequently measured within a predetermined frame.

In performing operation S904 of determining whether the touch sensing value is within a reference range and operation S905 of determining whether the touch sensing value is maintained for a reference time, the above-described method in FIG. 8 may be used.

When the touch sensing value is within the reference range and is maintained for a reference time or longer, the touch control circuit 330 may transfer a control signal for changing the amplitude of a driving voltage to the power circuit 320 or the readout circuit 310 (S906).

When the touch sensing value departs from the reference range or is not maintained for the reference time, the touch control circuit 330 may maintain the amplitude of the driving voltage (S907).

According to another embodiment, the driving mode of the panel may be determined in the above-described method based on the identification of the change rate of a touch sensing value, not based on a touch sensing value.

What is claimed is:

1. A touch sensing circuit comprising:
a touch power circuit configured to supply a driving signal to a readout circuit configured to transmit the driving signal to a touch electrode disposed on a panel; and
a touch control circuit configured to control an amplitude of the driving signal through a control interface for bidirectional communication, which is electrically connected with the touch power circuit, wherein
the touch power circuit comprises an amplifier for adjusting the amplitude of the driving signal,
when a touch sensing value, received from the readout circuit, is within a reference range for a time interval of a pre-configured frame, the touch control circuit is configured to change the amplitude of the driving signal by transmitting a control signal to change a feedback resistance of the amplifier to the touch power circuit through the control interface, and
the control signal transmitted through the control interface between the touch control circuit and the touch power circuit indicates to increase the amplitude of the driving signal.

2. The touch sensing circuit of claim 1, wherein the touch control circuit and the touch power circuit are configured to communicate with each other through multiple interfaces.

3. The touch sensing circuit of claim 2, wherein one or more of the multiple interfaces for communication between the touch control circuit and the touch power circuit is configured to transfer another control signal comprising information relating to a type of a touch input, determined by the touch control circuit.

4. The touch sensing circuit of claim 3, wherein the type of the touch input comprises a glove touch or a normal touch.

5. The touch sensing circuit of claim 4, wherein
the touch control circuit is configured to enter the glove touch mode when a touch sensing value is within a reference range for a time interval of a pre-configured frame,
the touch control circuit is configured to set the amplitude of the driving signal to be higher in the glove touch mode than that the amplitude of the driving signal in the normal touch mode.

6. The touch sensing circuit of claim 2, wherein an interface of the touch control circuit is configured to perform communication in an inter-integrated circuit (I2C) scheme.

7. The touch sensing circuit of claim 1, further comprising a reference interface for unidirectional communication between the touch control circuit and the touch power circuit, wherein
the waveform of the driving signal is determined by the reference interface, and
the amplitude of the driving signal is determined by the control interface.

8. The touch sensing circuit of claim 1, wherein the touch sensing circuit is configured to:
(i) determine whether the touch sensing value is within the reference range,
(ii) after determining that the touch sensing value is within the reference range, determine whether the touch sensing value is within the reference range for the time interval of the pre-configured frame,
(iii) as a result of determining that the touch sensing value is not within the reference range for the time interval of the pre-configured frame, increase the amplitude of the driving signal.

9. A touch sensing circuit comprising:
a touch power circuit configured to supply power to a readout circuit configured to transmit a driving signal to a touch electrode disposed on a panel; and
a touch control circuit configured to control an amplitude of the driving signal and to communicate with the readout circuit through a first interface, which is electrically connected with the touch power circuit, wherein
the readout circuit comprises an amplifier for determining the amplitude of the driving signal,
when an average of touch sensing values of frames, received from the readout circuit, is within a reference range for a time interval of a pre-configured frame, the touch control circuit is configured to change the amplitude of the driving signal by transmitting a control signal to change a feedback resistance of the amplifier to the touch power circuit through the first interface, and
the control signal transmitted through the first interface between the touch control circuit and the touch power circuit indicates to increase the amplitude of the driving signal.

10. The touch sensing circuit of claim 9, further comprising a second interface for communication between the touch control circuit and the touch power circuit, wherein
the readout circuit is configured to receive information about the waveform of the driving signal through the second interface.

11. A touch control circuit for controlling a touch power circuit driving signal through multiple interfaces, the touch control circuit comprising:
a first interface, for communication between a touch power circuit supplying power and the touch control circuit, configured to transfer the touch power circuit driving signal to the touch power circuit; and
a second interface, for communication between the touch power circuit and the touch control circuit, configured to transfer a touch power circuit control signal to the touch power circuit, wherein
the first interface is configured to transfer information about a waveform of the touch power circuit driving signal, and the second interface is configured to transfer the touch power circuit control signal for changing an amplitude of the touch power circuit driving signal,
the touch control circuit is configured to set a driving mode of a panel as one of a first mode and a second mode, and
the touch control circuit is configured to set the driving mode of the panel as the first mode when a touch sensing value within a reference range for a pre-configured time interval and is configured to increase the amplitude of the touch power circuit driving signal when the driving mode is switched from the second mode to the first mode, and
the touch power circuit is configured to control the amplitude of the touch power circuit driving signal by adjustment of a feedback resistance rate, and
the touch power circuit control signal transmitted through the second interface between the touch control circuit and the touch power circuit indicates to increase the amplitude of the touch power circuit driving signal.

12. The touch control circuit of claim 11, further comprising a third interface, for communication between a readout circuit performing a touch sensing and the touch control circuit, configured to transfer a readout circuit driving signal to the readout circuit.

13. The touch control circuit of claim 11, wherein
a type of a touch input is determined based on a touch sensing value of a readout circuit performing a touch sensing, and
the touch power circuit control signal transferred to the second interface is changed according to the type of the touch input.

14. The touch control circuit of claim 13, wherein
a change rate of the touch sensing value of the readout circuit is determined, and
the amplitude of the touch power circuit driving signal is changed through the second interface when the change rate of the touch sensing value is maintained within a reference range during a reference frame.

15. The touch control circuit of claim 11, wherein the touch power circuit driving signal is a sine-wave signal.

16. The touch control circuit of claim 11, wherein a signal transferred through the first interface and a signal transferred through the second interface are independent of each other.

17. The touch control circuit of claim 11, wherein another control signal for changing the amplitude of the touch power circuit driving signal is transferred through the second interface.

* * * * *